E. M. BENFORD.
GASOLENE GAGE.
APPLICATION FILED JUNE 25, 1915.
1,206,196.
Patented Nov. 28, 1916.
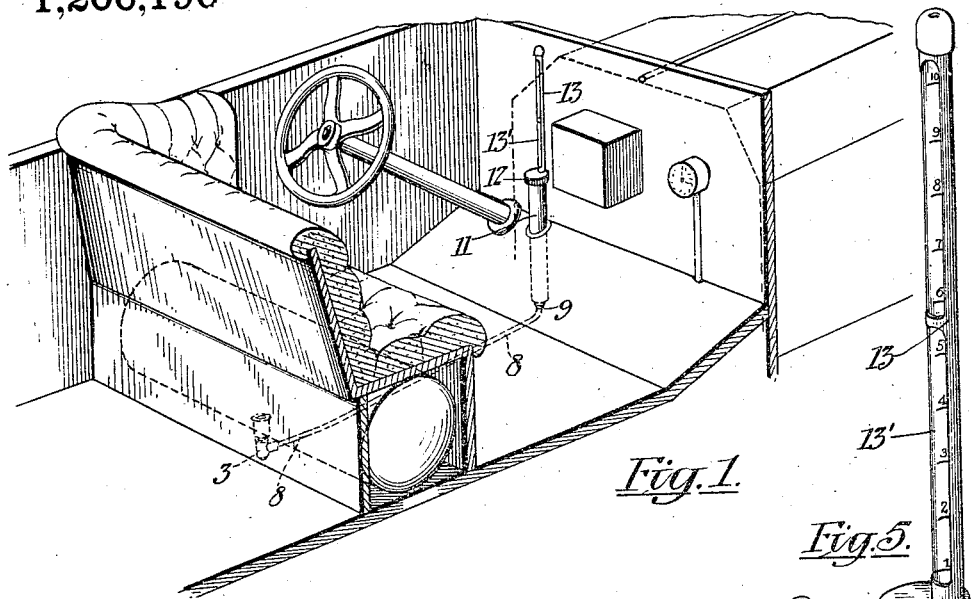
Fig. 1.
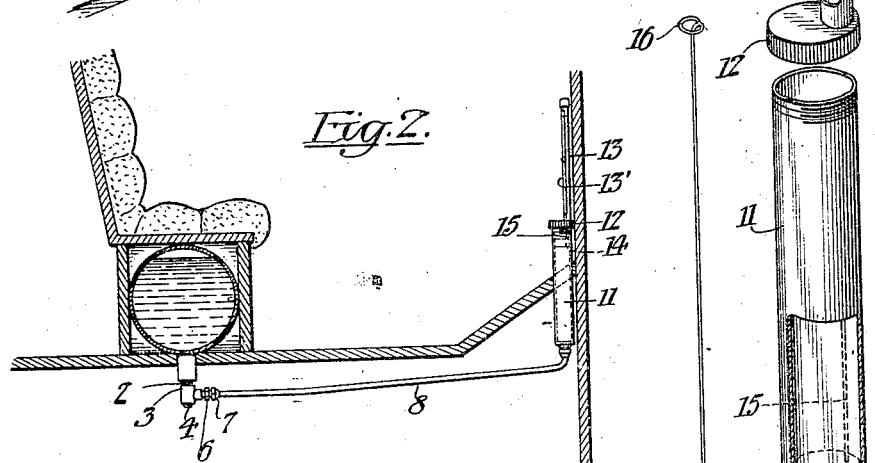
Fig. 2.
Fig. 3.
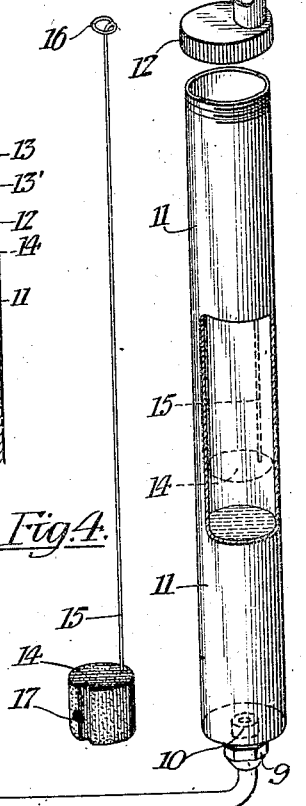
Fig. 5.
Fig. 4.
Witnesses:
Inventor:
Edward M. Benford.
by his Attorney

UNITED STATES PATENT OFFICE.

EDWARD M. BENFORD, OF MOUNT VERNON, NEW YORK.

GASOLENE-GAGE.

1,206,196.  Specification of Letters Patent.  Patented Nov. 28, 1916.

Application filed June 25, 1915. Serial No. 36,176.

*To all whom it may concern:*

Be it known that I, EDWARD M. BENFORD, a citizen of the United States, residing at Mount Vernon, in the county of Westchester and State of New York, have invented certain new and useful Improvements in Gasolene-Gages, of which the following is a specification.

This invention relates to liquid gages, and more particularly to a device of this kind which is specially adapted for use with automobiles, the object of the invention being to provide a simple and inexpensive gasolene gage which will accurately indicate the quantity of gasolene in the gasolene tank at all times, and to provide a device of this character which can be placed in close contact with the dash board in a convenient position for indicating the amount of gasolene in the tank.

In the drawings accompanying and forming part of this specification, Figure 1 illustrates a portion of an automobile with this improved gage attached thereto, part of the automobile body being removed to more clearly show the manner in which the device is installed; Fig. 2 is a sectional side view of a portion of a car, also showing the gage in position; Fig. 3 is a sectional side view showing the coupling member for connecting the gasolene tank with the tube leading to the gage; Fig. 4 is a perspective view of the float member for indicating the amount of gasolene in the tank; and Fig. 5 is a perspective view, partly in section, of the outer shell or casing of the gage showing the upper portion detached therefrom.

Similar characters of reference indicate corresponding parts throughout the several figures of the drawings.

In gages of this general class, as usually constructed, the indicator is of circular or arc shape with a pointer which is operated around the dial by means of a spirally bent or twisted wire connected to one end of the pointer, the twisted wire passing loosely through the center of a float. Consequently the movements of the float up and down have to overcome the frictional resistance between the twisted wire and the float, and the float is therefore liable to stick on account of this resistance. The object therefore of the present improvement is to provide a gasolene gage in which the changes in the quantity of gasolene in the tank act directly on the indicator without first having to overcome any frictional resistance whatever.

Gasolene tanks used in automobiles are usually provided at the lowest portion thereof with a nipple where the tube for leading the gasolene to the carbureter is connected, this portion of the tank being provided with a suitable strainer. Into the lower end of this nipple is inserted, in the present improvement, an exteriorly threaded member 2, on the opposite end of which is screwed one branch of a T-shaped connecting member 3 having its opposite branch fitted with a screw threaded plug 4, which may be removed to permit the tank to be emptied. The remaining branch of this T-shaped member 3 is interiorly threaded for the reception of a suitable packing box or coupling. This packing box comprises an exteriorly threaded sleeve 5 having located centrally of the length thereof a nut receiving portion 6, one end of the member 5 being adapted to be screwed into the T-shaped member 3, and the opposite end for receiving a coupling member 7 which fits on the end of the pipe 8 connecting the tank with the indicator and which pipe is outwardly flanged at its end so as to retain the coupling member 7 thereon and make a tight liquid-proof joint. The connecting pipe 8 is provided at its opposite end with a similar coupling member 9 adapted to be turned onto a threaded nipple 10 carried at the bottom of the gasolene cylinder or cup 11. Threaded on the upper end of this gasolene cup is a removable cap or closure 12 having connected thereto, away from the center or at one side theref, a gage tube 13. This gage tube may be made of any suitable material, as for instance, brass, and is provided with a cut-away portion to form a sight opening having a transparent member 13' closely fitting the brass tube so as to permit the driver to observe the amount of gasolene in the tank.

Located within the cup 11 is an indicator in the form of a float 14 formed of cork or other suitable material and having a rod or wire 15 placed off center or at one side of said float so as to correspond with the position of the gage tube 13, the diameter of the float 14 being somewhat smaller than the inner diameter of the cup 11. The rod 15 is provided at its upper end with an enlarged head 16 shown bent from the end of the wire. This float member is provided with a cut-away portion 17 lengthwise thereof so as to permit the easy escape of air from one end to the other, thereby to permit the float to readily respond to the rise and fall of the gasolene in the tank. It will be observed that when this float member is placed within the cup 11, its rod 15 is off center so as to register with the gage tube 13, and as this float is permitted to descend in the cup by reason of the gasolene being consumed, the head 16 of the rod will be located somewhere along the length of the gage tube according to its proximity to one of the numerals 1 to 10 which are marked on the inside of the gage tube, these markings being so graduated as to correspond to the number of gallons of gasolene in the tank. The cup 11 is attached to the dash board in such position that the top and bottom thereof correspond with the top and bottom of the gasolene tank, and when the tank is full the float will be at the top of the cup and the head 16 of the rod will be opposite the numeral 10 in the gage tube.

It will be observed that by placing the gage tube off center, that is eccentric to the cup, the back of the gage tube is approximately in line with the outer longitudinal line of the cup so that the entire device can be set close up against the dash board.

Of course, it will be understood that the tube 13 might be dispensed with and merely a graduated scale used in place thereof, with a suitable pointer connected to the rod 15 to indicate on the scale the amount of gasolene in the tank, and such construction is considered within the purview of my invention.

I claim as my invention:—

1. A gasolene gage comprising an upright float-carrying chamber, an upright indicating tube of less diameter than said chamber and eccentrically connected with the top thereof and having an opening along a portion of its length and provided on its inner surface with a graduated quantity-indicating scale, a float in said chamber, an indicator connected thereto and extending into said tube, and means for connecting the chamber with a gasolene reservoir.

2. A gasolene gage comprising an upright float-carrying chamber, an upright indicating tube of less diameter than said chamber and eccentrically connected with the top thereof and having an opening along a portion of its length and provided on its rear inner surface with a graduated quantity-indicating scale, a float in said float chamber and having a passage therethrough, an indicator connected with said float and extending into said tube, and means for connecting the chamber with a gasolene reservoir.

3. A gasolene gage comprising an upright float-carrying chamber, a removable cover therefor, an upright indicating tube of less diameter than said chamber and eccentrically connected with the removable cover and having an opening along one portion of its length and provided on its rear inner surface with a graduated quantity-indicating scale and also having a transparent medium covering said opening, a float in said float chamber and having a passage therethrough, an indicator connected with said float and extending into said tube, and means for connecting the chamber with a gasolene reservoir.

EDWARD M. BENFORD.